July 25, 1950  C. A. BREEZE  2,516,544
FRICTION CLUTCH
Filed Dec. 27, 1948  2 Sheets-Sheet 1
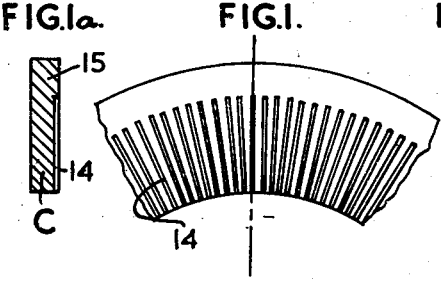
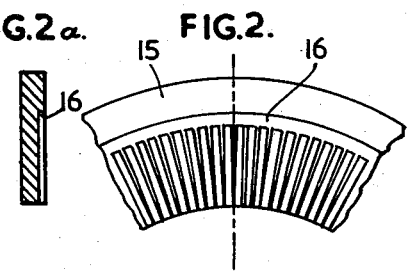
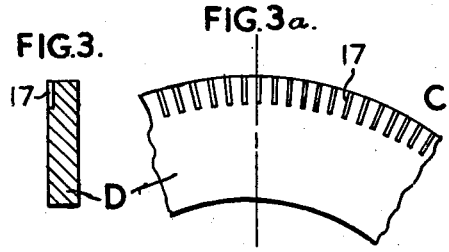
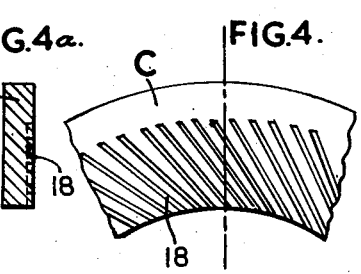
Inventor
CHARLES A. BREEZE
By
Young, Emery & Thompson
Attorneys Patented July 25, 1950

2,516,544

UNITED STATES PATENT OFFICE 2,516,544

FRICTION CLUTCH

Charles A. Breeze, Aberdeen, Scotland

Application December 27, 1948, Serial No. 67,316
In Great Britain January 10, 1948

9 Claims. (Cl. 192—113)

This invention relates to friction clutches of the kind comprising at least one pair of spaced coaxial driving and driven discs having annular contact faces, and means for applying pressure to the discs to effect frictional engagement between their contact faces.

According to the present invention a clutch of the kind above set forth is provided with fluid flow passages or channels in the contact face of one of the discs, the inlet ends of said passages or channels communicating with an enclosed inner space between the discs inwardly of the said contact faces, to which space a fluid under pressure is supplied in a series of rapidly recurring impulses, and the exit ends of the said passages or channels terminate inwardly of a plain circumferential surface portion of the contact face in which the said passages or channels are formed.

The effect of this construction is to cause oscillations of pressure to be set up between the clutch contact faces, these oscillations of pressure synchronizing with the recurring fluid pressure impulses and effecting alternate separation and closing of the contact faces during engagement of the clutch. The frequency of the oscillations of pressure is constant so long as the frequency of the recurring fluid pressure impulses is constant, and is independent of the relative speed of the driving and driven discs. As the drive is taken up, the fluid pressure supply to the space between the discs may be reduced and eventually cut off on the cessation of relative rotation between the driving and driven discs.

The recurring fluid pressure impulses may be produced by the provision of a high speed injection pump of the type used, for example, for fuel injection in Diesel engines.

Passages or channels may be formed in both coacting contact faces of the clutch elements inwardly of plain circumferential abutting surface portions of the said contact faces, all the said passages or channels communicating at their inner ends with the enclosed space between the discs.

Alternatively, a contact face having passages or channels inwardly of a circumferential plain surface portion may coact with a contact face having channels or passages extending inwardly from its periphery and terminating at their inner ends outwardly of the exit ends of the passages or channels in the other contact face.

The clutch discs may be enclosed in a chamber formed by a surrounding casing into which the fluid thrown out at the periphery of the clutch elements is discharged, and from which the fluid may be withdrawn by the pump.

The passages in the clutch contact faces may be composed of minute closely spaced grooves or channels and intervening ribs which extend radially, tangentially or in a curve from the inner edge of the contact face to a plain surface at its circumference. The said plain surface may be coplanar with the top of the ribs and extends radially outwards from the ribs.

The arrangement is such that oscillations of pressure are set up in the fluid between the mating clutch surfaces of adjacent clutch elements so that, at the peaks of the pressure waves, the clutch tends to behave as a thrust bearing, and at the troughs of the pressure waves the clutch engages, so that the drive is transmitted in a series of rapid impulses.

The oscillations of pressure are created by fluctuations of hydrostatic pressure in the grooves due to outward movement of the fluid under centrifugal action supplemented by the pump pressure, this hydrostatic pressure acting against the pressure applied to close the clutch plates and being relieved by the escape of fluid past the plain surface of the clutch element when the hydrostatic pressure between the clutch elements exceeds the applied closing pressure.

The invention in various forms is exemplified in the accompanying drawings in which:

Fig. 1 illustrates a fragment of a clutch plate according to one form of the invention and shown in section in Fig. 1a.

Figs. 2 and 2a are views similar to Figs. 1 and 1a of a modified form.

Fig. 3 shows a fragment (in face view) of a co-operating clutch plate shown in section in Fig. 3a.

Fig. 4 is a face view of a fragment of a modified form of clutch plate, shown in section in Fig. 4a.

Figs. 5, 6 and 7 are enlarged sectional views showing various forms of grooves and ribs which may be employed.

Figure 8:
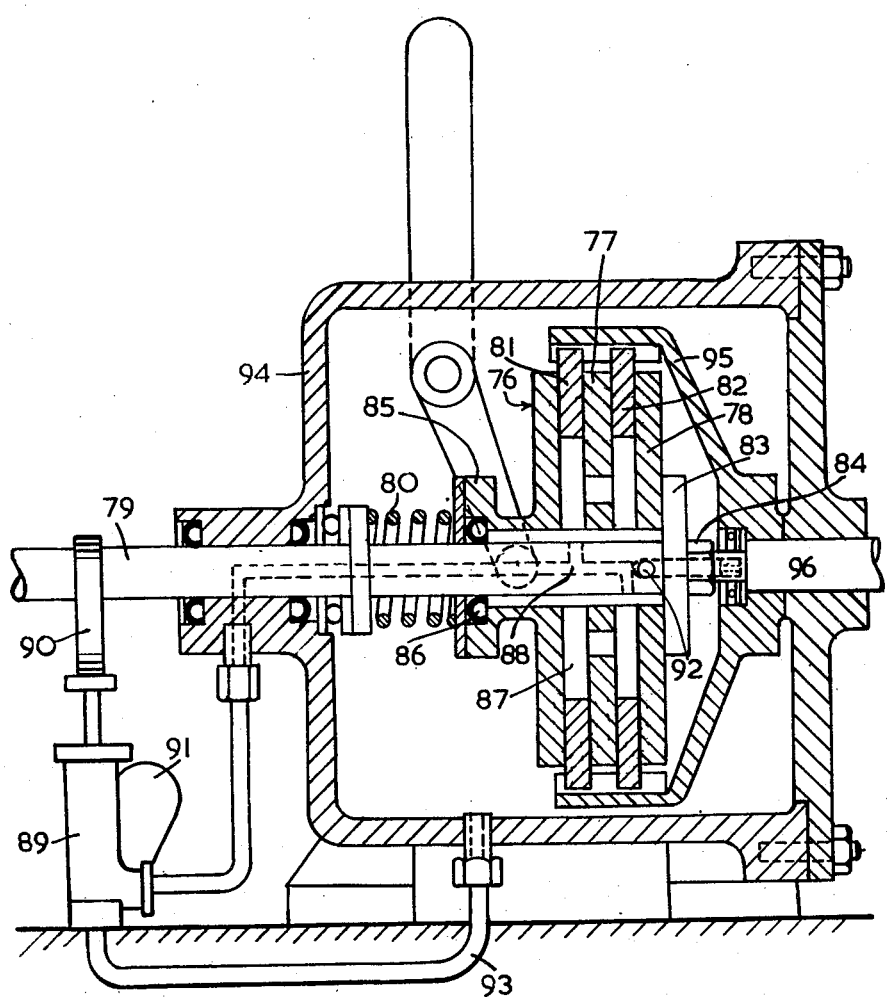
Fig. 8 illustrates, in sectional elevation, a clutch according to one form of the invention embodying a pump for supplying the fluid in a series of recurring impulses.

As shown in Figs. 1 and 1a, a ring or disc C is provided on its contact surface with a plurality of minute grooves 14 which may be radial as shown, or inclined as shown in Fig. 4, or they may curve towards the periphery of the disc. The grooves may or may not be of uniform depth or width, this depending on the desired effect. The grooves extend outwards towards, but terminate a short distance from the periphery of the disc, leaving a plain surface 15. The surface of the mating disc may be either similar, or plain, or any of the discs shown in Figs. 1, 2, 3 and 4 may mate with one another.

When the two mating discs are rotated and caused to approach each other by applied pressure, the fluid in which they are immersed is carried round in the grooves 14 and forced radially outwards by centrifugal action. As the discs meet, the radial flow is arrested by contact of the mating disc with the plain surface 15 and a hydrostatic pressure is developed in the fluid between the discs. This pressure tends to separate the discs and, when sufficiently great to overcome the applied closing pressure, the discs separate and fluid escapes radially past the plain surface 15. The hydrostatic pressure is thus relieved, the discs are pressed together again by the applied closing pressure, and the drive is resumed. Thus until the applied pressure is greater than the developed hydrostatic pressure, the clutch slips, and when the applied pressure is greater than the hydrostatic pressure the clutch engages. If the applied pressure is maintained above the maximum available hydrostatic pressure, oscillation ceases and the drive is transmitted continuously as in an ordinary friction clutch. The invention reduces wear of the friction surfaces during the period of engagement, and if the oscillating condition is maintained, the clutch operates as a power transmission mechanism of fixed or variable ratio between the driving and driven members. The clutch elements will always separate when the applied pressure is removed, thus giving perfectly free disengagement.

In some of the drawings, the clutch disc is shown with grooves on one side only, but if the clutch disc is interposed between a pair of rotary clutch surfaces, grooves would be provided on both faces of the clutch disc.

Figs. 2 and 2a illustrate a modification in which the grooves 14 open into a circumferential groove 16 in order to equalize any irregularity of pressure that might occur on the circumferential surface of the discs. There may be two or more circumferential grooves such as 16.

Figs. 3 and 3a show a form of clutch disc D which may be used as a mating disc with either of the discs shown in Figs. 1 and 2, the disc D having radial grooves 17 which extend over a portion of the surface which covers the plain surface 15 of the disc C in order to assist the radial outward flow of the fluid medium towards the periphery of the discs.

Figs. 4 and 4a illustrate a modification in which the clutch disc C has inclined grooves 18.

The grooves 14, 17, 18 or 19 may be of V-shape as shown in Fig. 5 or of saw-tooth form as in Fig. 6 or they may be semi-circular grooves as in Fig. 7, or of any other suitable form in cross-section. The grooves may also be of uniform depth or the grooves may vary in depth throughout their length and the mating grooves in the disc D may also vary in depth throughout their length.

The grooved surfaces may be formed either on an integral part of the discs or on detachable and renewable facings.

Fig. 8 illustrates how the pressure between the clutch elements may be obtained by the provision of a pump of the high speed variable delivery type used for the injection of fuel in Diesel engines. The pump may be driven either from the driving shaft of the clutch or by independent means. Driving discs 76, 77 and 78, which may have any of the forms shown in Figs. 1, 2 and 4, are free to slide along a splined driving shaft 79 and to engage under the pressure of a spring 80 with two driven discs 81 and 82 which may have either plain contact faces or be similar to any of the forms shown in Figs. 1-4. The driving disc 78 bears against a collar 83 which is secured on the shaft 79 by means of a nut 84, and a flange 85 on the disc 76 is fitted with an oil seal 86. When the discs are in contact, a closed annular space 87 is formed between the discs and this space is connected by passages 88 in the shaft 79 to the delivery side of a pump 89 operated by means of a cam 90 on the shaft 79. The pump may be provided with an air vessel 91 and a relief valve 92 may be fitted in the delivery passage 88 to ensure pump delivery at a predetermined limit of pressure.

The fluid injected in rapidly recurring impulses into the annular space 87 by the pump 89 produces oscillations of pressure between the clutch contact faces, the frequency of these oscillations corresponding to the frequency of the pump strokes. If the pump speed is constant, the oscillations of pressure will be of constant frequency, independently of the relative speed of the driving and driven discs. The pump delivery pressure should be such as to force the clutch discs apart against the action of the closing spring 80, so that the fluid periodically escapes from the annular space 87 through the separated contact faces of the discs, alternate separation and closing of the discs takes place in synchronization with the pump delivery. The fluid discharged from the periphery of the discs returns to the pump through a return pipe 93 connected to the bottom of a casing 94 in which the clutch is enclosed. The driven discs 81 and 82 are slidably engaged with a driven member 95 which is fixed on a driven shaft 96. As the drive is taken up by the driven discs 81 and 82, the delivery from the pump can be gradually reduced and eventually cut off by the operator.

In cases where a dry plate clutch is preferred, air may be substituted for a liquid medium, the oil pump 89 being replaced by an air pump or compressor or by a compressed air distributing valve arranged to deliver the air to the space 87 in rapidly recurring impulses.

No claim is made herein to the subject-matter of my co-pending application Serial No. 67,315 filed December 27, 1948.

I claim:

1. A friction clutch comprising a pair of spaced coaxial driving and driven discs having annular contact faces forming an enclosed inner space between said discs inwardly of said contact faces, means for rotating said driving disc, means for applying pressure to said discs to effect frictional engagement between their contact faces, fluid flow passages in the contact face of one of said discs, the inlet ends of said passages communicating with said enclosed inner space and the exit ends of said passages terminating inwardly of a plain circumferential surface portion of the contact face of said disc, and means for supplying a fluid under pressure to said enclosed inner space in a series of rapidly recurring impulses to effect intermittent separation of the clutch contact faces during engagement of the clutch.

2. A clutch as specified in claim 1 having fluid flow passages in the contact faces of both of said discs inwardly of plain circumferential abutting surface portions of said contact faces, said flow passages communicating at their inner ends with said enclosed inner space.

3. A clutch as specified in claim 1 wherein the said circumferential plain surface portion of one disc abuts against a surface portion of the other disc which has channels therein extending inwardly from its periphery and terminating at their inner ends outwardly of the exit ends of the fluid flow passages in the first-mentioned disc.

4. A clutch as specified in claim 1 wherein the fluid is supplied to the space between the discs by means of a high speed injection pump.

5. A clutch as specified in claim 1 including a casing forming an enclosed chamber for said discs, and means for withdrawing the fluid from said chamber.

6. A clutch as specified in claim 1 including a casing forming an enclosed chamber for said discs, a high speed injection pump delivering to the space between said discs, and a connection from said chamber to the inlet side of said pump.

7. A multi-plate friction clutch comprising a driving disc, annular driving plates rotatable with said disc, a driven disc, annular driven plates rotatable with said driven disc and alternating with said driving plates, a casing forming a chamber enclosing said discs and plates, means for rotating said driving disc, channels in the surfaces of said driving and driven plates, the channels in one of each pair of coacting surfaces extending outwards from a space between the discs to outer plain abutting circumferential surface portions of said pair of coacting surfaces, means for supplying fluid under pressure to the space between said discs in a series of rapidly succeeding impulses to effect intermittent separation of said plates during engagement of the clutch by forcing the fluid outwards between the plain abutting surface portions of said plates, means for withdrawing fluid from said chamber, and means for applying pressure to said discs to effect frictional engagement therebetween.

8. A multi-plate friction clutch comprising a driving disc, annular driving plates rotatable with said disc, a driven disc, annular driven plates rotatable with said driven disc and alternating with said driving plates, a casing forming a chamber enclosing said discs and plates, means for rotating said driving disc, channels in the surface of said driving and driven plates, the channels in one of each pair of coacting surfaces extending outwards from a space between the discs to outer plain abutting circumferential surface portions of said pair of coacting surfaces, channels in the other one of each pair of coacting surfaces, said last-mentioned channels extending inwardly from the periphery of said surfaces and terminating at their inner ends outwardly of the outer ends of said first-mentioned channels, means for supplying fluid under pressure to the space between said discs in a series of rapidly succeeding impulses to effect intermittent separation of said plates during engagement of the clutch by forcing the fluid outwards through said channels, and between the coacting surfaces, means for withdrawing fluid from said chamber, and means for applying pressure to said discs to effect frictional engagement therebetween.

9. A multi-plate friction clutch comprising a driving disc, annular driving plates rotatable with said disc, a driven disc, annular driven plates rotatable with said driven disc and alternating with said driving plates, a casing forming a chamber enclosing said discs and plates, means for rotating said driving disc, channels in the surfaces of said driving and driven plates, the channels in one of each pair of coacting surfaces extending outwards from a space between the discs to outer plain abutting circumferential surface portions of said pair of coacting surfaces, a high speed injection pump delivering fluid in a series of rapidly recurring impulses to the space between said discs, a return connection from said chamber to the inlet side of said pump, and means for applying pressure to said discs to effect frictional engagement therebetween.

CHARLES A. BREEZE.

REFERENCES CITED

The following references are of record in the file of this patent:

UNITED STATES PATENTS

| Number | Name | Date |
| --- | --- | --- |
| 1,746,148 | Eaton | Feb. 4, 1930 |
| 1,936,240 | Lane | Nov. 21, 1933 |
| 2,097,710 | Whitelaw | Nov. 2, 1937 |

FOREIGN PATENTS

| Number | Country | Date |
| --- | --- | --- |
| 819,502 | France | of 1937 |